United States Patent [19]
Dufresne

[11] Patent Number: 5,135,359
[45] Date of Patent: Aug. 4, 1992

[54] EMERGENCY LIGHT AND SUMP PUMP OPERATING DEVICE FOR DWELLING

[76] Inventor: Jacques Dufresne, 6889 Lamont, Montreal, Quebec, Canada, H4E 2T8

[21] Appl. No.: 652,630

[22] Filed: Feb. 8, 1991

[51] Int. Cl.⁵ .................................. F04B 49/06
[52] U.S. Cl. ........................... 417/36; 417/40; 417/411; 362/20; 362/183
[58] Field of Search ............ 417/36, 40, 411; 362/20, 183

[56] References Cited

U.S. PATENT DOCUMENTS

| | | | |
|---|---|---|---|
| 3,941,507 | 3/1976 | Niedermeyer | 417/44 |
| 4,222,711 | 9/1980 | Mayer | 417/36 |
| 4,349,863 | 9/1982 | Petersen | 362/20 |
| 4,776,766 | 10/1988 | Brent | 417/411 |

*Primary Examiner*—Richard A. Bertsch
*Assistant Examiner*—David W. Scheuermann
*Attorney, Agent, or Firm*—Robic

[57] ABSTRACT

An emergency device for use in a dwelling or any similar place provided with a sump pump in the basement, in order to operate this sump pump and, if desired, to switch on some emergency light in the case of a failure of the main electric power source of this dwelling. The device includes a storage battery connected to the sump pump in such a manner as to operate it in the case of a failure of the main power source. It also includes a transformer-rectifier to permanently recharge the storage battery when the power source is in operation. It further includes external plugs connectable to the battery of an automotive vehicle parked near the dwelling with its motor running, in order to use this battery as a substitute for the indoor battery and thus allows the sump pump to continue to operate even when the storage battery indoors is down. Advantageously, the device may further include an additional circuit activated by relay to switch on some emergency lights inside the dwelling whenever there is a failure of the main power source.

10 Claims, 1 Drawing Sheet

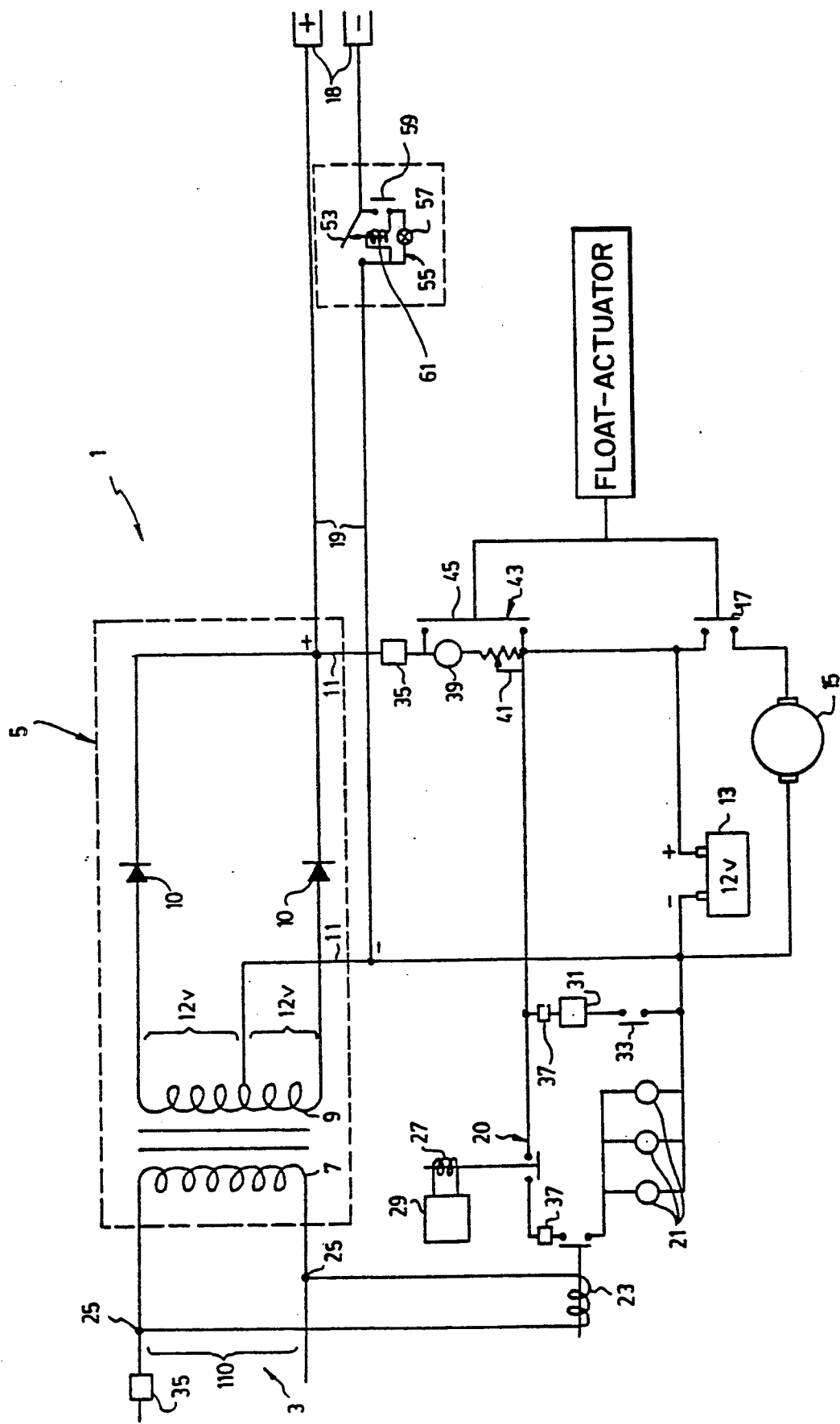

EMERGENCY LIGHT AND SUMP PUMP OPERATING DEVICE FOR DWELLING

BACKGROUND OF THE INVENTION a) field of the invention

The present invention is concerned with an emergency device for use in a dwelling or any similar place provided with a sump pump in the basement, in order to operate this sump pump and, if desired, to switch on some emergency lights in the case of a failure of the main electric power supply in this dwelling.

b) brief description of the prior art

As is well known, most of the dwellings, especially those located close to a lake or a river, are equipped with a draining unit comprising a sump reservoir, a sump and a water pump which is usually an electrical sump pump. The purpose of the reservoir is to collect rain and waste waters. When the collected water reaches a certain level, it is transferred to a sump, through a pipe, and then pumped out to the sewer by the sump pump.

The problem with such a "flood control system" is that it becomes incoperative in case of electric power failure. However, such failure usually occurs in the case of severe storm and/or river overflowing, i.e. when the sump pump is deeply needed.

To solve this problem, it has already been suggested to use "emergency" devices like those disclosed by way of examples, in U.S. Pat. Nos. 3,726,606 and 3,814,544.

In the first one of these two patents, i.e. U.S. Pat. No. 3,726,606, there is disclosed a sump apparatus comprising two pumps, a first one operated by a principal power source and a second one by a storage battery. A control system is provided to operate the first pump and simultaneously charge the storage battery when the principal power source is operative. The control system is also designed to automatically connect the second pump to the storage battery whenever the principal power source fails or the first pump alone is unable to empty the sump reservoir, in order to activate this second pump and thus makes it use that the sump reservoir is actually emptied. The control system further includes warning means including pilot lights and an ampmeter to indicate when both pumps are simultaneously operating and when there is some failure in the power source or storage battery.

In U.S. Pat. No. 3,814,544, there is disclosed an auxiliary sump pump assembly operated by a storage battery in response to a float switch, which includes an electrical battery charger for maintaining the battery in condition to operate. A control system is also provided, including a battery condition indicator, a charger operating light, a manual test switch and a timer to operating the pump through a test cycle.

Other devices, like the one disclosed, by way of example, in U.S. Pat. No. 3,162,134, have also been proposed in the past, for automatically connecting an emergency battery to the terminals of a pump motor to keep the pump running in the case of a main power failure, all of these devices including a battery charger for maintaining the emergency battery in condition to operate and a warning system to automatically inform the occupant of any misfunctioning.

If the emergency devices of the above mentioned type air efficient to keep a sump pump operative for a short period of time in the case of a major power failure, they are however inoperative over a long period of time. Indeed, they become inoperative as soon as the storage battery (which cannot anymore be recharged by the "charger" because of the power failure) runs down, such a running down being usually quite fast because, in the case of a major storm or overflow, the sump pump has to work almost permanently to prevent the basement of dwelling from being "drowned".

SUMMARY OF THE INVENTION

The object of the present invention is to provide an emergency device of the above mentioned type which overcomes the above mentioned deficiency.

More particularly, the object of the invention is to provide a very simply and efficient emergency device of the above mentioned type, which comprises "external" plugs connectable to the battery of an automotive vehicle parked near the dwelling preferably its motor running, in order to use the battery of this vehicle as a substitute for the indoor battery and thus allow the sump pump to continue to operate even when the indoor battery is down.

Therefore, the invention proposes an emergency device for use in a dwelling provided with an electrically powered sump pump in order to operate this sump pump in the case of a major electric power failure, this device comprising:

a transformer-rectifier having inlet terminals connectable to a standard electric power source within the dwelling and outlet terminals for delivering a 12 V DC current when the inlet terminals are connected to the power source and this power source is in operation;

a storage battery having terminals electrically connected to the outlet terminals of the transformer-rectifier so as to be permanently charged by said transformer-rectifier;

wiring means to connect the motor of the sump pump to the outlet terminals of the transformer-rectifier and to the terminals of the storage battery in such a manner that this motor is supplied by the power source via the transformer-rectifier when the power source is in operation and by the storage battery when the power source is off, the water level switch being mounted in series in the wiring means to control the operation of the sump pump whatever be the power supply of the sump pump motor, and a pair of external plugs connected to both the outlet terminals of the transformer-rectifier and the terminals of the storage battery, the external plugs being connectable to the terminals of the battery of an automotive vehicle parked near the dwelling, whereby the transformer-rectifier can be used whenever desired to charge or boost the battery of the automotive vehicle when the power source is in operation, and the battery of the automotive vehicle can be used as an alternative power source to operate the motor of the sump pump if the storage battery runs down in the case of a long electric power failure.

Advantageously, the emergency device according to the invention may further comprises:

an additional circuit connected to the terminals of the storage battery and including emergency lights mounted at different locations within the dwelling in order to provide some light in the case of an electric power failure; and a relay mounted in series in the additional circuit, the relay being operatively connected to the inlet terminals of the transformer rectifier in such a manner as to automatically switch on the additional circuit and thus switch on the emergency lights as soon as the power supply of the power source is off.

Another relay operatively connected to a light-sensing device such as a photocell can also be mounted in series in the additional circuit to automatically switch off the additional circuit and thus switch off the emergency lights when there is enough light within the dwelling.

BRIEF DESCRIPTION OF THE DRAWINGS

The invention will be better understood upon reading of the following, non restrictive description of a preferred embodiment thereof, reference being made to the accompanying drawing in which the single figure is a schematic representation of the electrical circuit of an emergency device according to the invention.

DESCRIPTION OF A PREFERRED EMBODIMENT

The emergency device 1 according to the invention as shown in the accompanying drawings is intended to be used in a dwelling provided with an electrically powered sump pump. The device 1 comprises a 110 V inlet 3 that can be plugged to any standard outlet in the dwelling. It also comprises a transformer-rectifier 5 whose primary 7 is connected to the 110 V inlet 3 and whose secondary 9 supplies a 12 V DC current between its terminals 11. Of course, the terminals of the primary 7 and the inlet terminals of the transformer-rectifier 5 whereas the terminals 11 of the secondary form its outlet terminals.

The device 1 further comprises a 12 V storage battery 13 whose terminals are respectively connected to the terminals 11 of the secondary 9 so as to be permanently charged by the transformer-rectifier 5.

The DC motor 15 of the sump pump (not shown) is connected by wires to the outlet terminals of the transformer-rectifier 5 and to those of the storage battery 13 in such a manner as to be supplied by the transformer-rectifier 5 when the "external" electric power supply at the inlet 3 is on, and by the storage battery 13 when the "external" electric power supply is cut off for any reason. Of course, the level switch 17 controlling the operation of the sump pump has to be located in the "loop" including the storage battery 13 and sump pump motor 15 as is shown in the drawings, to make this loop operative.

In accordance with the invention, to make the above device 1 "safer" and more complete, a pair of external plugs are respectively connected to the terminals of the secondary 9 of the transformer-rectifier 5 in such a manner as to be connectable to the terminals of the battery of a car or truck (not shown) parked near the dwelling, such as, for example, in an adjacent driveway. This feature makes it possible to recharge the battery of the car or truck with the transformer-rectifier when the standard electric power source is on. More importantly, this feature makes it possible also to use the battery of the car or truck as an alternative power source to operate the sump pump when the storage battery 13 of the device 1 runs down, such as, for example, after a long period of "black out".

Accordingly, even in the case of a very long period of power failure, the occupant of the dwelling always has the opportunity to operate the electric sump pump whose purpose is to avoid the basement from being flooded, by mere connection of the plug 19 to the terminals of the battery of his or her car or truck. Moreover, the same occupant may use the device 1 to recharge the battery of his or her car or truck, or to "boost" the same when every necessary, provided of course that the secondary power source is on.

In accordance with the invention, an additional circuit 19 can be added to the main circuit of the device 1 as disclosed hereinabove to operate some emergency lights 21 more mounted at different locations within the dwelling in the case of a power failure. This additional circuit 19 is connected to the terminals of the storage battery 13 and the transformer-rectifier 5, and is activated by a relay 23 connected to the terminals of the primary 5, i.e. to the inlets 3. In the case of power failure the relay 23 is activated and switches on the additional circuit 19, thereby switching on the emergency lights 21. Another relay 27 connected to a photocell 29 can be used to "automatically" switch off the additional circuit 19 and thus the emergency light 21 when there is enough day light inside the dwelling.

An alarm 31 may also be incorporated to the additional circuit 19 to ring a bell if, for any reason the water level within the reservoir of the sump pump in the basement exceeds a predetermined value. To achieve this purpose, the alarm 31 can be mounted in parallel to the emergency lights within the additional circuit 31 and be operatively connected to an over-level switch 33 which is mounted within the reservoir in the basement and activated as soon as the water level exceeds a predetermined value within the reservoir.

Of course, a plurality of overload breakers 35 and protective fuses 37 can be be incorporated into the main and additional circuits as is known per se to protect the same. An ampmeter 39 and a variable resistance 41 can also be incorporated into the main circuitry to adjust the load normally supplied to the terminals of the storage battery 13 and thus prevent it from being overloaded. Advantageously, a by-pass circuit 43 including a normally open switch 45 can be provided to by-pass the ampmeter 39 and the variable resistance 41 and thus to allow full load supply from the transformer-rectifier 5 to the sump pump motor 15 when this motor is in operation. To achieve this result, the switch 45 and level switch 17 can be operatively connected to work in unison. Alternatively, the switch 45 may consist of another level switch located in the sump reservoir, the level switches 17 and 45 being activated at the same time but independently from each other.

In order to avoid any misconnection of the positive and negative plugs 18 of the device 1, to the negative and positive terminals of the battery of the automotive vehicle parked outside the dwelling, a very simple yet efficient safety device 51 can be mounted onto the cables 19, preferably close to the plugs 18 to be easily accessible in use.

The safety device 51 comprises a main switch 53 that is mounted onto one of the cables 19. The safety device 51 also comprises a by-pass circuit 55, including a small 24 V light 57 and a relay 61 mounted in parallel, and an auxiliary switch 59 positioned in such a manner as to switch on both the lamp 57 and relay 61 when it is actuated. The relay 61 acts as an interlocking means for the main switch. To do so, the relay 61 is operatively connected to the main switch 53 in such a manner as to interlock the same in order to prevent it from being switched on whenever some current passes through the relay.

The safety device 51 disclosed hereinabove is intended to be used to check whether the plug connected via one of the cables 19 to the positive outlet terminal of the transformer-rectifier 5 is actually connected to the positive terminal of the battery of the vehicle as it should be to avoid explosion of this battery or other damages, while the "negative" plug is connected to the negative terminal of the same battery. To do so, one may only actuate the auxiliary switch 59 as soon as plugs 18 are connected to the battery of the vehicle, prior to actuating the main switch. If the light 57 does not light up, this means that the "positive" and "negative" plugs 18 have correctly been connected to the positive and negative terminals of the battery, respectively, since no current circulates along the cables 19. Then, the main switch 59 may safely be placed in the "on" position. If, however, the light 57 switches on when the auxiliary switch 59 is pressed, this means that the negative and positive plugs 18 have been connected wrongly to the positive and negative terminals of the battery, respectively, since some current circulates through the by-pass circuit 55. Then, one must change the position of the plugs 18.

It is worth mentioning that, thanks to the relay 61, the main switch 53 cannot be closed if the plugs 18 have been connected wrongly to the terminals of the battery. Indeed, in such a case, the relay 61 is actuated and interlocks the main switch 53, as it was explained hereinabove.

This double safety feature is particularly advantageous prevent accident, especially when the device 1 may be used by unexperienced persons or in very dark conditions. This double safety feature is also advantageous to check whether the light 57 is still good. Indeed, for testing purpose, one may simply connect both plugs 18 together to cause some current to circulate through the by-pass circuit 55 when the auxiliary switch is actuated. In this connection, it may be easily understood that the same safety device 51 could be used independently of the device 1 according to the invention, such as, for example, on conventional boosting cables.

I claim:

1. An emergency device for use in a dwelling provided with a sump pump powered by a DC current electric motor in response to a water level switch in order to operate this sump pump in the case of a major electric power failure, said device being also useful to charge or boost a battery of an automotive vehicle parked near the dwelling, said device comprising:

a transformer-rectifier having inlet terminals connectable to a standard electric power source within the dwelling and outlet terminals for delivering a 12 V DC current when the inlet terminals are connected to the power source and this power source is in operation;

storage battery having terminals electrically connected to the outlet terminals of the transformer-rectifier so as to be permanently charged by said transformer-rectifier;

means to connect the motor of the sump pump to the outlet terminals of the transformer-rectifier and to the terminals of the storage battery in such a manner that said motor is supplied by the power source via the transformer-rectifier when the power source is in operation and by the storage battery when the power source is off, a water level switch being mounted in series in said connecting means to control the operation of the sump pump, and a pair of external plugs respectively connected to both the outlet terminals of the transformer-rectifier and to the terminals of the storage battery, said external plugs being adapted to be connected to the terminals of the battery of the automotive vehicle parked near the dwelling;

whereby said transformer-rectifier can be used whenever desired to a charge or boost the battery of said automotive vehicle when the power source is in operation, and the battery of said automotive vehicle can be used as an alternative power source to operate the motor of said sump pump if the storage battery runs down in the case of a long electric power failure.

2. The emergency device of claim 1, further comprising:

an additional circuit connected to the terminals of the storage battery and including emergency lights mounted at different locations within the dwelling in order to provide some light in the case of an electric power failure; and a relay mounted in series along in said additional circuit, said relay being operatively connected to the inlet terminals of the transformer-rectifier in such a manner as to automatically switch on said additional circuit and thus switch on the emergency lights as soon as the power supply of the power source is off.

3. The emergency device of claim 2, wherein another relay operatively connected to a light-sensing device is mounted in series along said additional circuit to automatically switch off said additional circuit and thus switch off the emergency lights when there is enough light within the dwelling.

4. The emergency device of claim 1, further comprising a variable resistance mounted to adjust the load normally supplied by the transformer-rectifier to the storage battery, and a by-pass circuit including a normally open switch working in unison with said level switch so as to by-pass said variable resistance as soon as the motor is in operation.

5. The emergency device of claim 2, further comprising a variable resistance mounted to adjust the load normally supplied by the transformer-rectifier to the storage battery, and a by-pass circuit including a normally open switch working in unison with said level switch so as to by-pass said variable resistance as soon as the motor is in operation.

6. The emergency device of claim 3, further comprising a variable resistance mounted to adjust the load normally supplied by the transformer-rectifier to the storage battery, and a by-pass circuit including a normally open switch working in unison with said level switch so as to by-pass said variable resistance as soon as the motor is in operation.

7. The emergency device of claim 1, further comprising a safety device including a main switch for use to electrically connect at least one of the external plugs to the corresponding outlet terminal of the transformer-rectifier, light means to check whether the plugs have been corrected connected to the corresponding terminals of the battery prior to actuating the main switch; and interlocking means to prevent the main switch from being actuated if the plugs have been wrongly connected.

8. The emergency device of claim 3, further comprising a safety device including a main switch for use to electrically connect at least one of the external plugs to the corresponding outlet terminal of the transformer-rectifier, light means to check whether the plugs have been correctly connected to the corresponding terminals of the battery prior to actuating the main switch; and interlocking means to prevent the main switch from being actuated if the plugs have been wrongly connected.

9. The emergency device of claim 4, further comprising a safety device including a pair of main switches for use to electrically connect at least one of the external plug to the corresponding outlet terminal of the transformer-rectifier; light means to check whether the plugs have been correctly connected to the corresponding terminals of the battery prior to actuating the main switch; and interlocking means to prevent the main switch from being actuated if the plugs have been wrongly connected.

10. The emergency device of claim 6, further comprising a safety device including a pair of main switches for use to electrically connect at least one of the external plugs to the corresponding outlet terminal of the transformer-rectifier; light means to check whether the plugs have been correctly connected to the corresponding terminals of the battery prior to actuating the main switches and interlocking means to prevent the main switch from being actuated if the plugs have been wrongly connected.

* * * * *